United States Patent
Roper et al.

(10) Patent No.: US 7,756,470 B2
(45) Date of Patent: Jul. 13, 2010

(54) DISTRIBUTED REPEATER ARCHITECTURE

(76) Inventors: Mike Roper, 134 First Avenue, Ottawa, ON (CA) K1S 2G4; Paul Simpson, R. R. #4, Lanark, ON (CA) K0G 1K0

( * ) Notice: Subject to any disclaimer, the term of this patent is extended or adjusted under 35 U.S.C. 154(b) by 848 days.

(21) Appl. No.: 11/422,108

(22) Filed: Jun. 5, 2006

(65) Prior Publication Data
US 2006/0205344 A1     Sep. 14, 2006

Related U.S. Application Data (63) Continuation of application No. PCT/CA2004/002088, filed on Dec. 6, 2004.

(60) Provisional application No. 60/526,980, filed on Dec. 5, 2003.

(51) Int. Cl.
*H04Q 7/20* (2006.01)

(52) U.S. Cl. ............ 455/11.1; 455/12.1; 455/13.1; 455/13.3; 455/426.1; 455/500; 370/310; 370/315; 370/316

(58) Field of Classification Search ............ 455/11.1, 455/12.1, 13.1, 7, 13.3, 25, 426.1, 426.2, 455/550.1, 500, 517, 571, 572, 552.1, 445; 370/310, 315, 326, 323, 316
See application file for complete search history.

(56) References Cited

U.S. PATENT DOCUMENTS

| | | | | |
|---|---|---|---|---|
| 6,445,904 | B1* | 9/2002 | Lovinggood et al. | 455/7 |
| 6,724,350 | B1* | 4/2004 | Hill | 343/834 |
| 2004/0110469 | A1* | 6/2004 | Judd et al. | 455/15 |
| 2007/0010198 | A1* | 1/2007 | McKay, Sr. | 455/10 |

* cited by examiner

*Primary Examiner*—Keith T Ferguson (57) ABSTRACT

A distributed repeater architecture includes a donor unit having a donor antenna integrated with active electronic components, for receiving and amplifying RF signals from a fixed station of a wireless communications network. A coverage unit is coupled to the donor unit for processing the RF signals from the fixed station. A network of integrated active antenna modules (IAAMs) is coupled to the coverage unit. Each IAAM includes a respective antenna integrated with active electronic components, for amplifying and radiating the RF signals into a coverage area of the repeater. The system also provides means for controlling stability of the distributed repeater system.

36 Claims, 8 Drawing Sheets

DISTRIBUTED REPEATER ARCHITECTURE

CROSS-REFERENCE TO RELATED APPLICATIONS

The present application is a continuation application of PCT/CA04/02088 filed Dec. 6, 2004 which claims benefit from U.S. Provisional Patent Application No. 60/526,980 (Roper et al.) entitled "DISTRIBUTED REPEATER ARCHITECTURE" filed Dec. 5, 2003.

TECHNICAL FIELD

The present invention relates to on-frequency repeater systems, and in particular to a distributed architecture for on-frequency repeaters.

BACKGROUND OF THE INVENTION

On-frequency repeaters are known in the art for improving wireless services within defined regions of a wireless network, where signal levels would otherwise be too low for satisfactory quality of service. For example, within a building, or a built-up urban area, signal attenuation, shadowing by buildings and/or hills; noise generated by various radio frequency sources, and multi-path effects can seriously degrade the quality of desired RF signals. In some cases, a wireless network provider may install a repeater in order to improve service in a region lying at an edge of the coverage area serviced by a fixed station, thereby effectively extending the reach of the base-station. On-frequency repeaters are characterized by the fact that the input and output signals (in either the uplink or downlink path directions) have the same frequency.

Figures 1A, 1B:
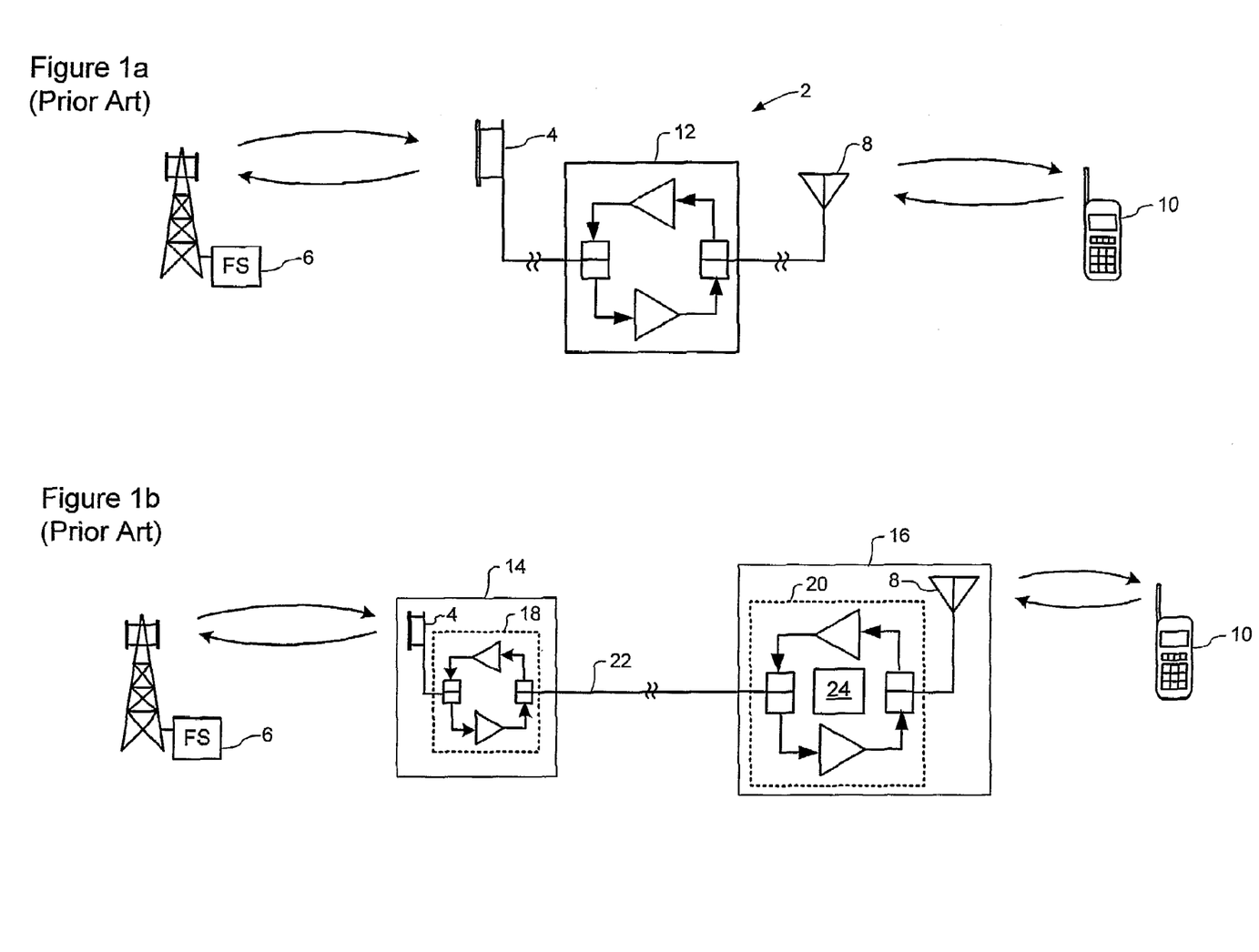
FIGS. 1a and 1b are block diagrams schematically illustrating respective conventional repeater architectures.

As may be seen in FIG. 1a, an On-frequency repeater 2 typically comprises a donor antenna 4 which "faces" a fixed station 6 and enables bi-direction RF signal traffic between the repeater 2 and the fixed station 6; a coverage antenna 8 which faces a mobile communications device (MCD) 10, such as a cellular handset; and an amplifier unit 12 connected between the donor and coverage antennas 4 and 8. The donor and coverage antennas 4,8 are passive devices, and are coupled to the amplifier unit 12 via suitable lengths of co-axial cable. This architecture suffers a disadvantage in that the amplifier unit 12 must compensate for line losses within the co-axial cables in addition to signal path losses (to/from the fixed station 6 and to/from the MCD 10), which increases the performance requirements, and thus the cost, of the amplifier unit. Compounding this problem is the fact that the high-gain components needed to deliver the required amplifier performance creates significant interference and cross-talk within the amplifier unit 12. Solving these issues further increases the cost of the repeater system.

Applicant's co-pending U.S. patent application Ser. No. 09/809,218, which is incorporated herein by reference, teaches a distributed repeater architecture. As shown in FIG. 1b, the repeater system is divided into a donor unit (DU) 14 and a coverage unit (CU) 16, each of which includes an amplifier block 18 and 20 integrated with a respective one of the donor and coverage antennas 4 and 8. A co-axial cable 22 connecting the two units 14 and 16 provides an RF path for up-link and downlink signal traffic, and also a DC power supply line so that, for example, the amplifier block 18 of the DU 14 can be powered by a power supply (not shown) of the CU 16. Typically, the amplifier block 18 of the DU 14 provide wide-band signal amplification to overcome signal losses in the co-axial cable 22. The CU amplifier block 20 provides more sophisticated signal processing functions, such as gain, power and system management, and oscillation control functions, some or all of which may be governed by a micro-controller 24 operating under software control.

As described in U.S. patent application Ser. No. 09/809,218, dividing the amplification unit 12 of the conventional repeater between the DU 14 and the CU 16 has an advantage that it enables lower-performance—and thus lower-cost—components to be used, without sacrificing overall repeater performance.

A limitation of the system of FIG. 1b is that integration of active electronics 20 and the coverage antenna 8 within a single coverage unit 16 imposes some limitations on the placement of that unit. In particular, the coverage unit 16 should preferably be positioned at a location that is most favourable from the point of view of optimizing the coverage area of the CU antenna 8. However, this location may not be conveniently close to a source of electrical power, for example. In addition, the close integration of the coverage antenna 8 and active electronics 20 within the CU 16 may impose undesirable limitations on the maximum permissible coverage area that can be served by the repeater system.

Accordingly, a low cost, extensible repeater architecture remains highly desirable.

A further limitation of the system of FIG. 1b is that oscillation may occur if the gain between the donor antenna and any individual coverage node is less that the net gain between the antennas, in either the uplink or downlink direction. The difference between the repeater gain and antenna isolation is known as the stability margin of the system.

Stability Margin=Antenna Isolation−Net Repeater Gain

If the stability margin is <0 dB, the repeater system will oscillate at one or more frequencies, generating interference in the host communications network. Even if the system does not oscillate, operation at point where the stability margin is low (<3 dB, for example) may cause the noise output of the repeater to increase above its normal value. In the uplink direction, this may cause desensitization of the base-station, with consequent reduction in the coverage area of the base-station. It is therefore highly desirable that a distributed repeater system such as that shown in FIG. (1b) should be provided with the means to operate with a constant and adequate stability margin, as presented in applicants co-pending U.S. patent application Ser. No. 10/299,797 which describes a means of monitoring and maintaining the stability of an on-frequency repeater comprising a Donor Unit and a Coverage Unit, based on the use of a Coverage Area Signature (CAS).

SUMMARY OF THE INVENTION

An object of the present invention is to provide a low cost, extensible repeater architecture. This object is met by the combination of features defined in the appended independent claims. Further, optional features of the present invention are defined in the dependent claims.

Thus, an aspect of the present invention provides a distributed repeater architecture comprising: a donor unit having a donor antenna integrated with active electronic components, for receiving and amplifying RF signals from a fixed station of a wireless communications network; a coverage unit coupled to the donor unit for processing the RF signals from the fixed station; and a network of integrated active antenna modules (IAAMs) coupled to the coverage unit, each IAAM including a respective antenna integrated with active electronic components, for amplifying and radiating the RF signals into a coverage area of the repeater.

A further aspect of the present invention provides, in a distributed repeater system having a donor unit for receiving and amplifying RF signals from a fixed station of a wireless communications network and a coverage unit coupled to the donor unit, for processing the RF signals from the fixed station and radiating the processed RF signals into a coverage area of the repeater, the improvement comprising: a network of integrated active antenna modules (IAAMs) coupled to the coverage unit, each IAAM including a respective antenna integrated with active electronic components, for amplifying and radiating the processed RF signals into a respective portion of the coverage area of the repeater. The system also provides means for controlling stability of the distributed repeater system.

A further aspect of the present invention provides a means of monitoring and controlling stability in a distributed repeater architecture comprising at least one Coverage Area Signature (CAS) generator and receiver, and an associated micro-controller and variable gain amplifiers used to adjust the gain of the system in the downlink and/or uplink directions.

A second embodiment of the stability monitoring and control system for the distributed repeater architecture uses a separate CAS generator and receiver, together with the associated micro-controller and variable gain amplifiers in each IAAM.

The present invention provides a distributed repeater architecture that is highly flexible, readily extensible, and low-cost, and protects the host network from noise or spurious signals.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a repeater architecture that enables the installation of very low-cost, highly efficient repeater systems. Embodiments of the present invention are described below with reference to FIGS. 2-7.

Figure 2A:
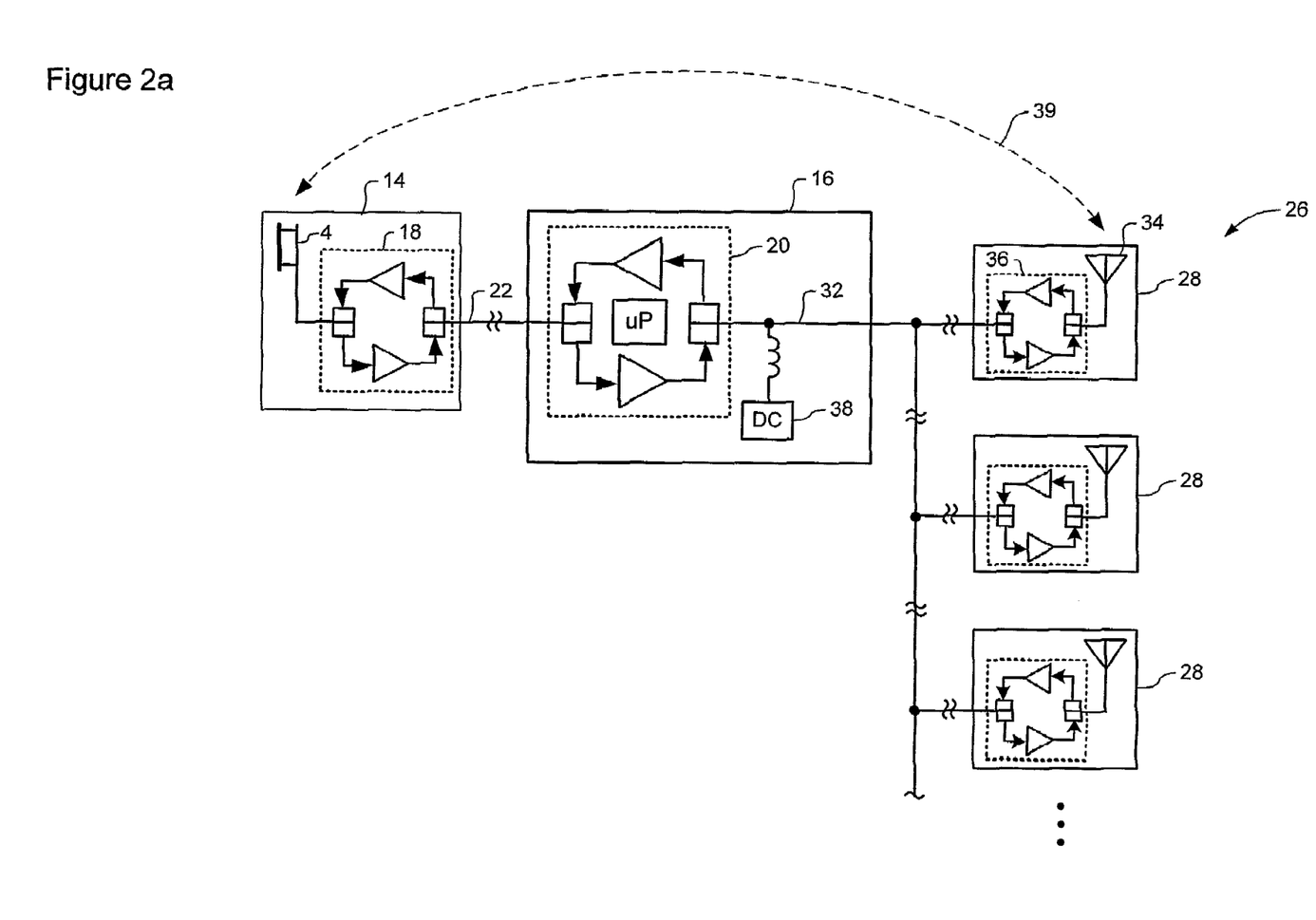
FIGS. 2a and 2b is a block diagram schematically illustrating a repeater architecture in accordance with a first embodiment of the present invention.
Figure 2B:
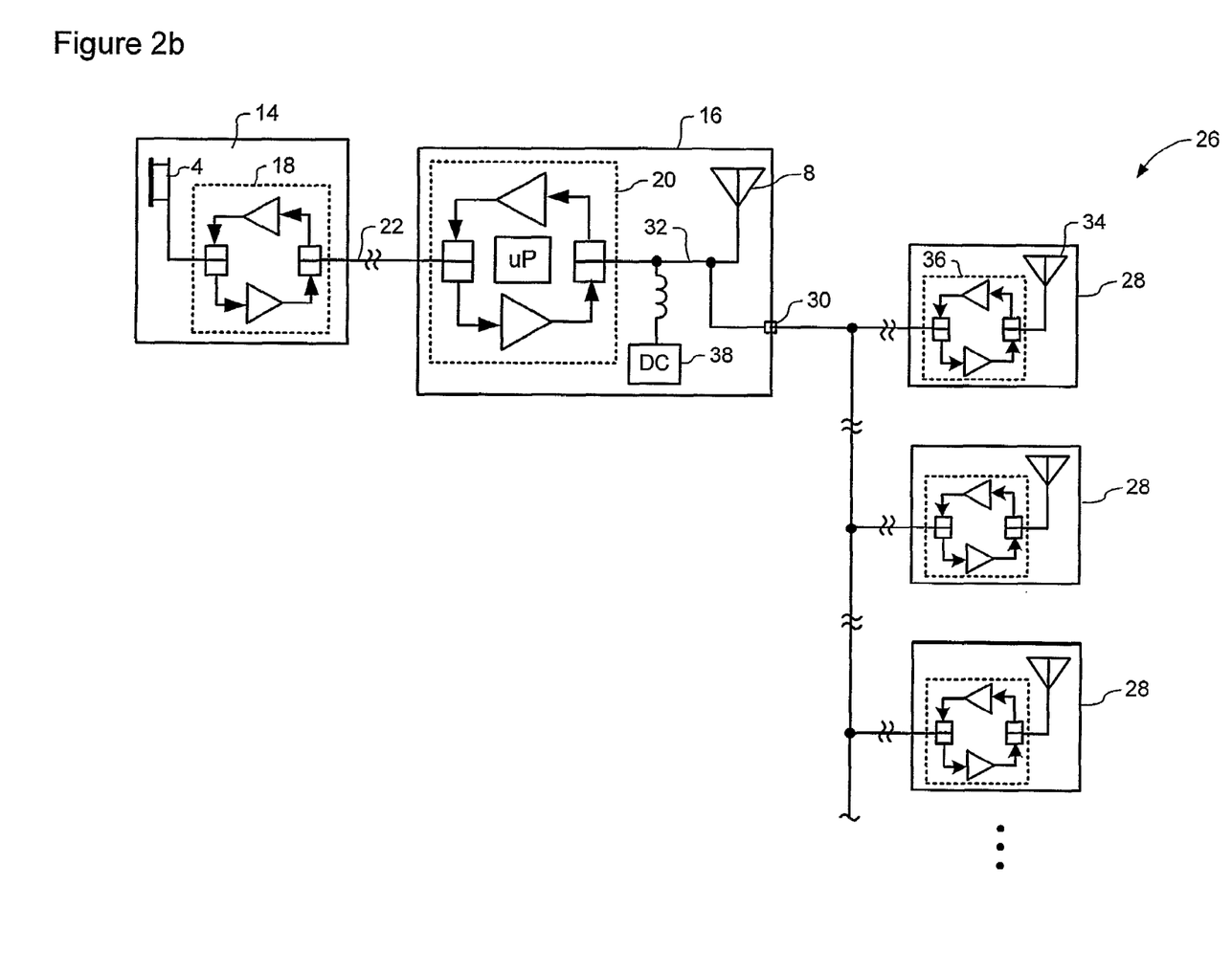
Figure 3:
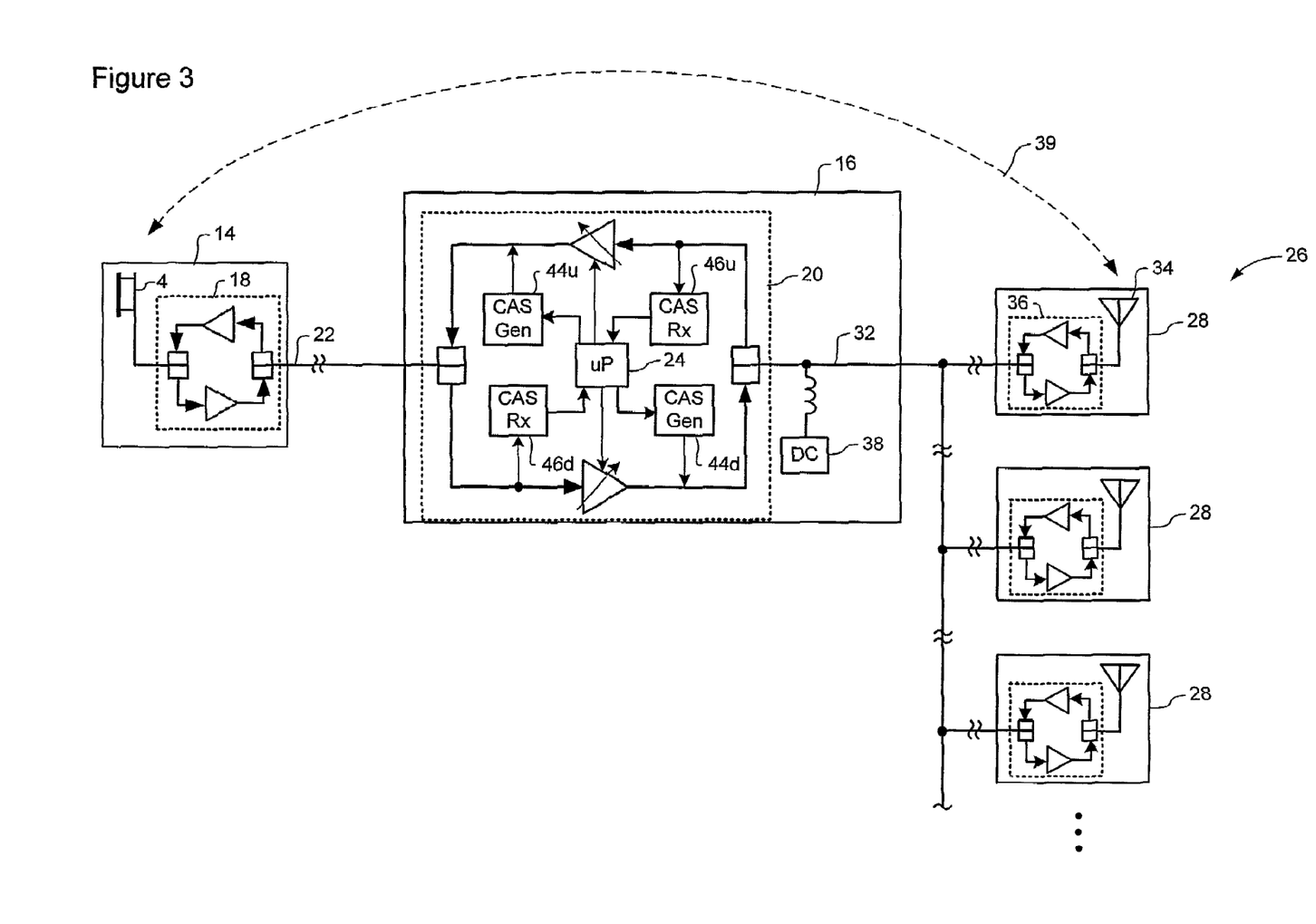
FIG. 3 is a block diagram schematically illustrating a repeater architecture in accordance with a second embodiment of the present invention.

As may be seen in FIGS. 2a and 2b, the present invention provides a readily extensible network 26 of one or more low cost integrated active antenna modules (IAAMs) 28 coupled to the coverage unit, via, for example, low cost co-axial cable. In the embodiment of FIG. 2a, the IAAM network 26 is connected in place of the integrated coverage antenna 8 of the prior art repeater described above with reference to FIG. 1b. In the embodiment of FIG. 3, the original integrated coverage antenna 8 is retained, and the IAAM network 26 is connected to an output port 30, which is coupled to the RF signal path 32 of the CU 16. In either case, the IAAMs 28 can be connected to the coverage unit in a chain (as illustrated) or in a star pattern, as desired.

Preferably, each IAAM 28 is substantially identical to the DU, and thus includes an antenna 34 integrated with an amplifier block 36, which compensate signal losses in the cable between the IAAM 28 and the CU 16. As with the DU 14, the co-axial cable coupled between the CU 16 and each IAAM 28 provides an RF path for up-link and downlink signal traffic, as well as a DC supply line for powering the active components of the module. Because each IAAM 28 compensates its own cable losses, the CU 16 can support several IAAMs 28 without excessively loading the components of the CU amplifier block 20. As such, the primary limitation on the number of IAAMs 28 that can be connected to the CU 16 is imposed by the power limits of the DC power supply 38 used to provide DC power to the IAAMs 28. Provision of IAAMs 28 in this manner takes advantage of economies of scale to reduce the cost of both IAAMs 28 and the DU 14, while only slightly increasing the cost of the CU 16. In fact, the CU 16 of FIG. 2 may even be less costly than the conventional CU, due to elimination of the coverage antenna 8. Placing part of the gain, and RF signal radiation in the IAAMs 28 also reduces the requirements for RF isolation and heat dissipation within the CU itself, thereby allowing lower cost construction techniques to be used.

The antenna 34 of the IAAM 28 can be either an omni-directional antenna or a directional antenna closely similar the donor antenna 4. Use of a directional antenna has some advantages, such as, for example, reducing both signal leakage back to the donor antenna 4 and multipath effects within the coverage area of the repeater system.

FIG. 2 shows a leakage path (39) between an IAAM and the donor antenna 4 of one IAAM 28 corresponding leakage paths will exist between each IAAM antenna 34 and the donor antenna 4 If the isolation between these antennas is less than the net gain of the repeater system, including antenna gains and cable losses, the system will oscillate, causing a spurious output signal to be radiated by the donor antenna 4 and/or the IAAM antennas 34. This can be prevented by using a Coverage Area Signature (CAS) to monitor and control the stability of the distributed repeater. Various types of CAS, and methods for monitoring and controlling stability using same, are described, for example, in applicant's co-pending U.S. patent application Ser. No. 09/919,888 filed Aug. 2, 2001; Ser. No. 10/299,797, filed Nov. 20, 2002; and Ser. No. 10/917,385, filed Aug. 13, 2004. In general, a low level signature signal is synthesized and inserted into the broadband signal path (either at RF or in an IF stage), and transmitted. Signal components corresponding to the signature signal are then detected in a received signal, and used to estimate various properties, such as antenna isolation, stability margin etc. This arrangement can be implemented in the downlink path, where signal leakage from the (omni-directional) coverage antenna 8 back to the donor antenna 4 tends to be problematic, and/or the uplink path, where amplification and transmission of spurious signals to the fixed station 6 can degrade overall wireless network performance. In the case of the distributed repeater system of the present invention, Coverage Area Signatures may be implemented in a number of ways, as will be described below with reference to FIGS. 4-6.

FIG. 3 illustrates an embodiment in which the CAS algorithm is implemented in the coverage unit 16. In this case, a respective CAS generator 44 and detector 46 is provided in the CU 16 for each of the uplink and downlink paths. As may be appreciated, the CAS generator 44 and detector 46 can be implemented using any suitable combination of hardware and software. In some cases, the microcontroller 24 can be used to implement part or all of the CAS generator 44 and/or CAS detector 46. Naturally, if CAS is being implemented in only one direction, the CAS generator 44 and detector 46 associated with the opposite signal path would be omitted.

In the downlink direction, the CAS waveform generated (at 44), superimposed on the in-band downlink signal traversing the CU 16, and thereby distributed to all of the IAAMs 28. Each IAAM 28 further amplifies the CAS waveform (along with the desired signal), and radiates it into the coverage area of the system. If the isolation between the antenna 34 of any one of these IAAMs 28 and the donor antenna 4 is poor, then the CAS signature will be superimposed on the input signal to the Donor Unit, amplified by the downlink RF chain and detected by the downlink CAS detector 46 in the CU 16.

Based on the detection result, the microcontroller 24 executes a gain control algorithm which adjusts the overall gain of the repeater to optimize system performance. Thus, for example, as the CU gain is reduced, the overall system gain is also reduced, and the stability margin improves. This also reduces the magnitude of the CAS signature superimposed at the input to the DU, and hence the level detected by the CAS detector 46. The CAS system can therefore be designed to provide a constant stability margin, by setting a threshold for the CAS detector 46. If the received CAS power level exceeds the threshold, the system gain is reduced. If the received CAS power level is less than the threshold, then the isolation is adequate and the gain may be increased by the microcontroller 24. System stability may be farther enhanced if the gain control step size is adapted to both the rate of change of the received CAS amplitude and it's absolute magnitude, relative to the decision threshold.

The technique described above can be applied equally in the uplink direction. In this case the CAS waveform is superimposed on the uplink signal and radiated with it from the Donor Antenna 4. The uplink CAS detector 46 is connected to the uplink input of the CU 16 and receives uplink signals from all of the IAAMs 28 connected to the CU 16. The radiated CAS signal may be fed back to any one or more of the IAAM antennas 34 by a signal path with poor isolation. It is then amplified by the uplink gain stages of that particular IAAM 28 and fed to the CAS receiver 46. The microcontroller 24 then operates as described above to adjust the uplink gain of the system.

In the uplink direction it is also important that each IAAM 28 have its own means of preventing the CU 16 from being over-driven by a large uplink signal. This can be implemented by means of an Automatic Gain Control (AGC) loop in the uplink path of the IAAM 28. If the AGC function is implemented in the CU 16, then a strong signal at any IAAM 28 input reduces the uplink gain of the whole system, affecting the uplink path of mobile handsets communicating via the other IAAMs 28.

In the technique described above, when the stability margin of the system falls below the desired threshold, the gain is reduced at the central coverage unit 16. This reduces the overall gain of the system though all the IAAMs 28 (in downlink, uplink, or both directions). This has the effect of reducing the coverage area provided by the entire system, when in fact it may only be a single IAAM 28 that experiences poor isolation.

Figure 4:
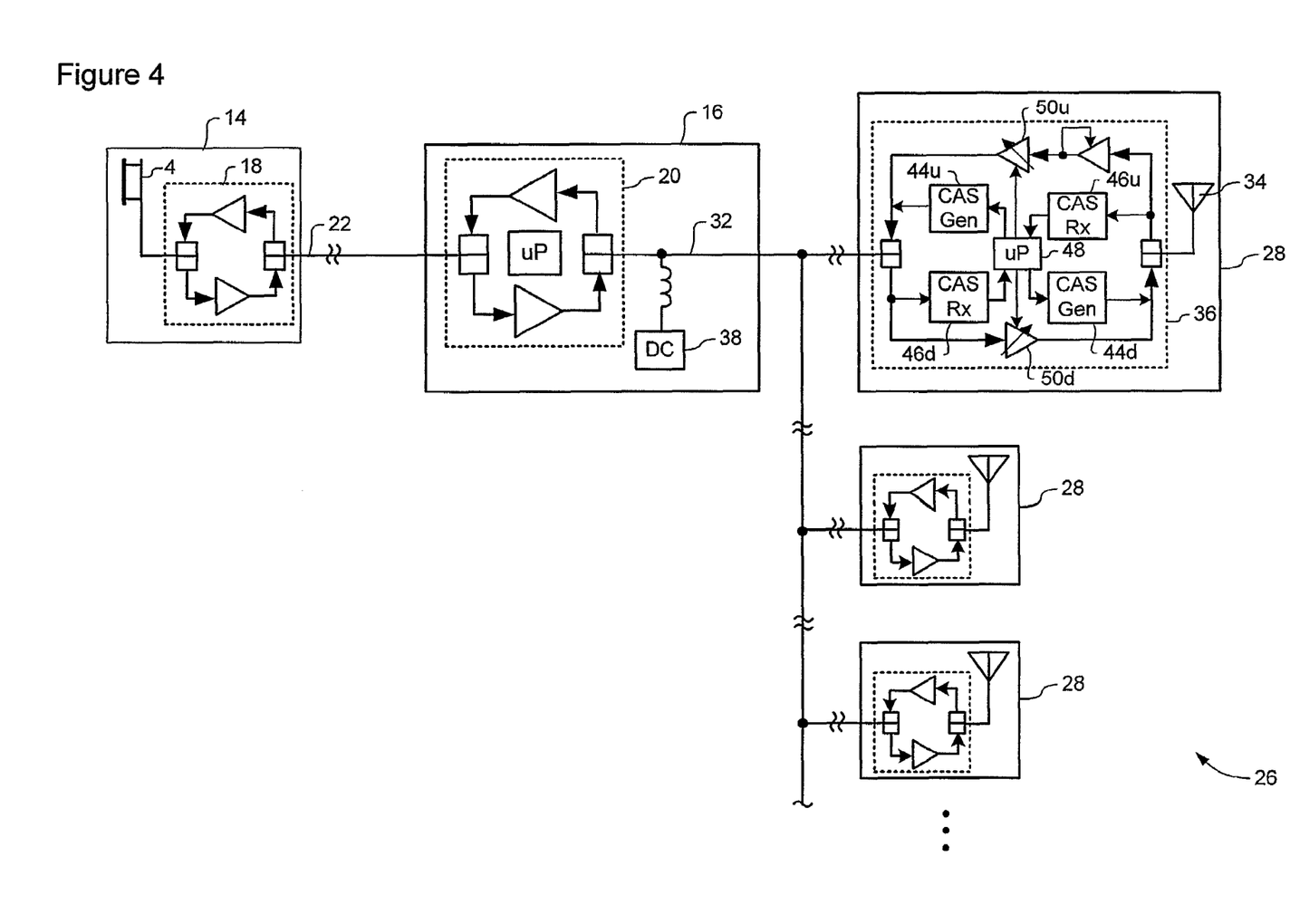
FIG. 4 is a block diagram schematically illustrating a repeater architecture in accordance with a third embodiment of the present invention.

FIG. 4 show one method of overcoming this limitation, by implementing a separate CAS algorithm in each IAAM 28. As may be seen in FIG. 4, this solution involves providing each IAAM 28 with a microcontroller 48, as well as a CAS generator 44 and detector 46 for either one or both of the uplink and downlink directions, as desired. A respective variable gain amplifier 50 controlled by the IAAM microcontroller 48 is also provided in each IAAM 28. With this arrangement, the CAS algorithm operates largely as described above, but in this case each microcontroller 48 only adjusts the gain of the respective IAAM 28. If the isolation between any IAAM 28 and the donor antenna 4 is adequate, it will operate at full gain. If one or more IAAMs 28 do not have adequate isolation from the DU antenna 4, then they will automatically adjust their gain to provide the desired stability margin, and only these IAAMs 28 will have a reduced coverage area. Consequently, poor isolation of one IAAM 28 only affects the involved IAAM 28, rather than the entire repeater system.

It is important in this embodiment that the respective CAS waveforms generated by each IAAM 28 do not interfere with one another, and can be correctly identified by the appropriate CAS receiver 46. This can be achieved by mulitplexing the waveforms in time, or by using separate CAS waveform frequencies. Non-interference may also be achieved by using a set of orthogonal codes to generate the CAS waveforms, or by superimposing a set of orthogonal codes on a CAS waveform. In each case the CU microcontroller 24 may be used to set the unique time or frequency characteristics of the CAS waveform at each IAAM 28, and this information "uploaded" to each IAAM 28, for example via control channel signalling, during system start-up. Alternatively these may be derived from a unique key, such as a serial number, that is built into each IAAM 28 itself, for example during manufacture.

The embodiment described above requires that a microcontroller 48 or similar signal processing device is used in the IAAM 28 to implement the CAS function and control the gain of the IAAM 28. A second micro-controller 24 or processor is also used in the CU 16 to control the overall system functions such as operating frequency and CU gain. A data communications link will generally be required to coordinate the operation of the CU 16 and IAAM 28, for example to ensure each IAAM 28 operates in an orthogonal fashion to its peers or to set the operating frequency an power level of the CAS generator. The communications link may also be used to allow the CU and IAAM controllers to exchange data on signal levels in order to optimize the system gain settings in the CU or IAAM, or to provide system status and alarm indications at each unit.

Figure 5:
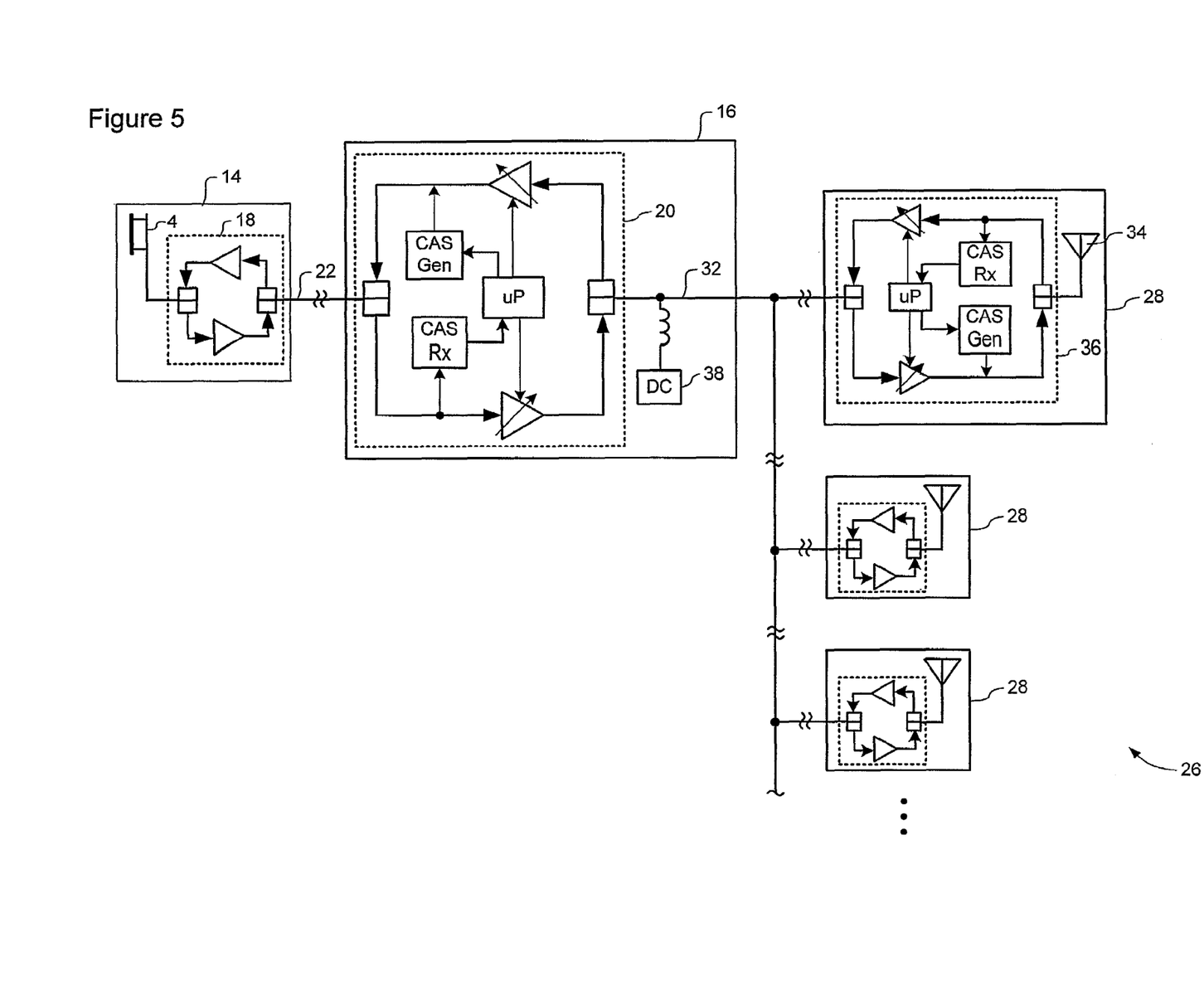
FIG. 5 is a block diagram schematically illustrating a repeater architecture in accordance with a fourth embodiment of the present invention.

FIG. 5 show an alternative arrangement in which the CAS functionality is split between the CU and the IAAMs. Thus, for example, in the downlink direction, a unique CAS waveform can be generated (at 44) and radiated into the coverage area of each IAAM 28. If the isolation between the antenna 34 of any one of the IAAMs 28 and the donor antenna 4 is poor, then the associated CAS signature will be superimposed on the input signal to the Donor Unit 14, amplified by the downlink RF chain and detected by the downlink CAS detector 46 in the CU 16. Based on the detection result, the microcontroller 24 can estimate antenna isolation (between each IAAM antenna 34 and the donor antenna 4) and transmit associated gain control commands, e.g. via control-channel signalling, to the respective microcontroller 48 of the appropriate IAAM 28. The IAAM microcontroller 48 can then adjust the IAAM gain (via the associated VGA 50) in accordance with the commands received from the CU microcontroller 24. In the uplink direction, a CAS waveform is synthesized in the CU 16, and transmitted through the donor antenna 4. Each IAAM 28 is provided with a respective uplink CAS detector 46 connected to its uplink input. The radiated CAS signal may be fed back to any one or more of the IAAM antennas 34 by a signal path with poor isolation. It is then detected by the respective CAS receiver 46 of the affected IAAM 28. The IAAM microcontroller 48 can then either adjust the IAAM uplink gain (via the associated VGA 50), or forward the detection result to the CU microcontroller 24, and adjust the IAAM uplink gain in response to commands received from the CU microcontroller 24.

Figure 6:
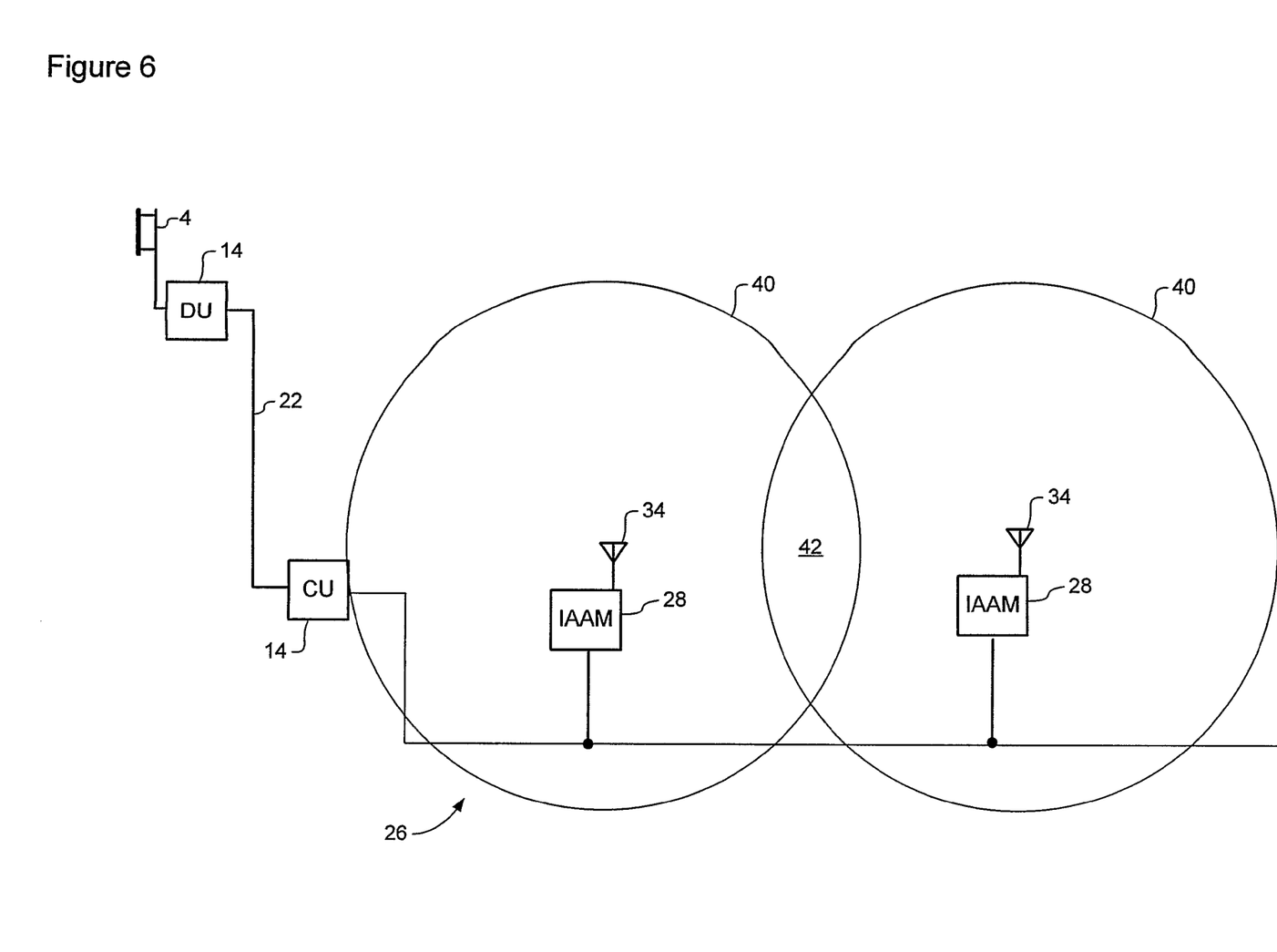
FIG. 6 schematically illustrates overlapping local coverage areas produced by the repeater system of FIG. 2.

FIG. 6 shows a further view of the embodiment of FIG. 2, in which the local coverage area 40 of each IAAM 28 is illustrated. As may be seen, the use of multiple IAAMs 28 significantly extends the total coverage area of the repeater system beyond that which would be practical with a single coverage antenna 8. However, a consequence of this is that, in order to provide continuous coverage, the local coverage areas 40 of adjacent IAAMs 20 must necessarily overlap. A mobile communications device 10 (not shown in FIG. 4) operating within the overlap region 42 will experience a strong multi-path environment. This is because the signal transmitted by adjacent IAAMs in the downlink is essentially identical. At some points in the overlap of the two IAAM coverage area two signals will be received by a mobile handset from the two IAAMs with equal power, but opposite phase. In this condition, the two signals can almost completely cancel each other, and the mobile only receives a much lower residual signal level, potentially to the point where data can no longer be received by the handset. This phenomena, which appears as a deep local null in the signal radiated by the distributed repeater system, will exist at many points within the overlapping coverage area. Modern digital systems can tolerate a momentary and periodic signal loss through the use of redundancy in the various voice and data coding schemes employed. However a prolonged loss of signal will cause a connection to be terminated by the network base-station controller. If the signal from each IAAM is independently varied either in amplitude or phase, then the conditions for forming a null at any given point in the coverage area will only be temporary, preventing the loss of a connection. If a separate CAS system is used in each IAAM, the amplitude and phase variation of the signal may be conveniently provided by the CAS generator. If a single CAS generator is used in the CU, then an additional, independent means of varying the amplitude of phase at each IAAM must be provided.

Figure 7:
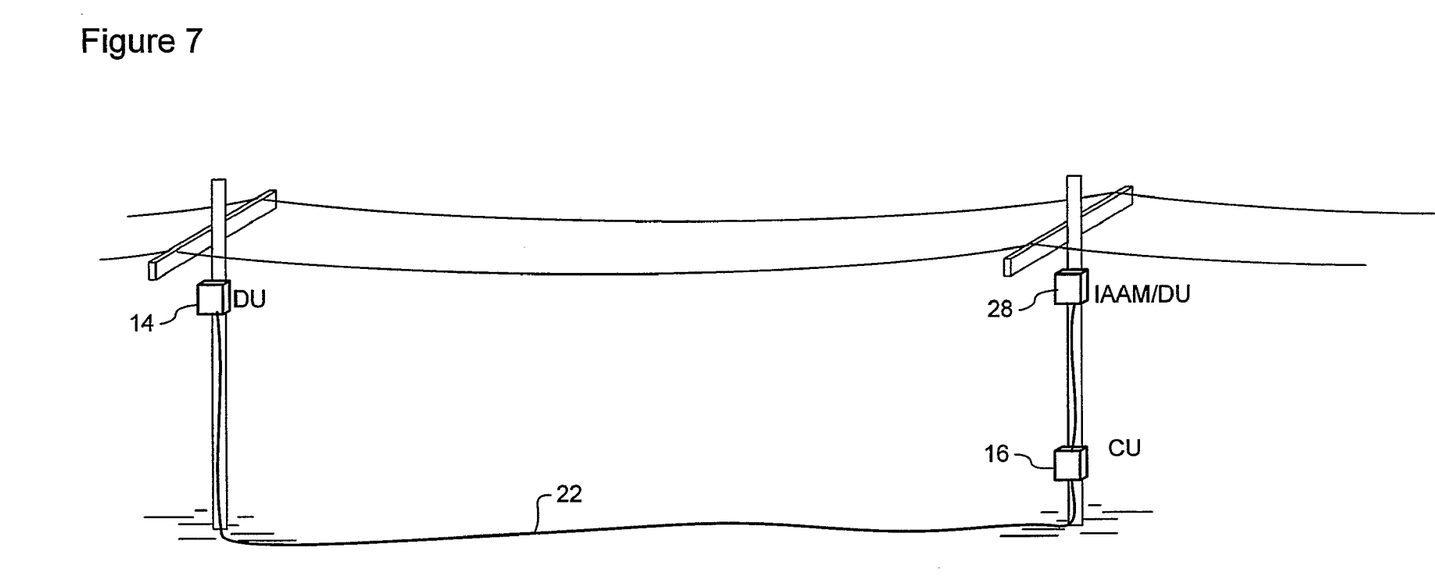
FIG. 7 schematically illustrates the repeater of FIG. 2 installed in out out-door application.

The same phenomena exists in the uplink, except that the cancellation occurs when the mobile signal is received by two IAAMs, and then combined in the distribution network. The result is that the signal received by the DU and then the network base-station can also fade severely. By independently varying the amplitude and/or phase of the uplink signals in each IAAM the fade duration can be made short. In repeater systems used to provide coverage outdoors, the coverage area required may be much greater than for an indoor system. Therefore these distributed repeater systems have a higher gain than indoor systems. The increased system gain may be provided by adding one or more IAAMs to a repeater. This prevents any one module in the system having a very high gain, with consequent need for comprehensive internal shielding, and the costs associated with this. At the same time there is a limited opportunity for shielding antennas in an outdoor environment, so that the increased system gain afforded by the addition of one or more integrated active antenna modules 28 may produce excessive signal leakage and resulting reduction of the repeaters stability margin and hence coverage. One method of resolving this difficulty is by increasing the physical separation between the DU 14 and the IAAMs 28 serving the repeater's coverage area. In-field experiments have shown that, in many cases, a separation distance equivalent to the average spacing between utility poles provides sufficient isolation. Thus, for example, the repeater system of the present invention may conveniently be installed as shown in FIG. 7, in which the DU 14 is located on one utility pole, and the integrated active antenna module 28 mounted on an adjacent utility pole. The CU 16 can be installed at any convenient location (e.g. close to a source of power, and the three units interconnected by co-axial cable.

The embodiment(s) of the invention described above is(are) intended to be exemplary only. The scope of the invention is therefore intended to be limited solely by the scope of the appended claims.

We claim:

1. A distributed repeater system that has:
    (a) a donor unit that:
        (i) has a donor antenna integrated with active electronic components and
        (ii) receives and amplifies RF signals from a fixed station of a wireless communications network;
    (b) a coverage unit that is coupled to the donor unit and processes the RF signals from the fixed station;
    (c) a network of integrated active antenna modules (IAAMs) that are coupled to the coverage unit, each have a respective antenna integrated with active electronic components, and amplify and radiate the RF signals into a coverage area of the repeater;
    (d) a system that controls stability of the distributed repeater system using:
        (i) a signal generator that generates a Coverage Area Signature (CAS) signal and inserts the CAS signal into an RF path that traverses the repeater system;
        (ii) a detector that detects signal components corresponding to the CAS signal in an input signal received by the repeater system; and
        (iii) a microcontroller that controls a gain of the repeater system based on the detected result.

2. A distributed repeater system as claimed in claim 1, comprising one signal generator and one detector coupled to an uplink path of the repeater system, and a second signal generator and detector coupled to a downlink path of the repeater system.

3. A distributed repeater system as claimed in claim 1, wherein the signal generator, detector, and the microcontroller are disposed in the coverage unit, and wherein the microcontroller operates to control an overall gain of the repeater system.

4. A distributed repeater system as claimed in claim 1, wherein each IAAM comprises a respective signal generator, detector, and microcontroller, and wherein the respective microcontroller of each IAAM operates to control a local gain of the IAAM.

5. A distributed repeater system as claimed in claim 4, wherein the respective CAS signal generated by the signal generator of each IAAM is unique, at least among the IAAMs forming the network.

6. A distributed repeater system as claimed in claim 1, wherein the detector and the microcontroller are disposed in the coverage unit, and each IAAM comprises a respective signal generator.

7. A distributed repeater system as claimed in claim 6, wherein the respective CAS signal generated by the signal generator of each IAAM is unique, at least among the IAAMs forming the network.

8. A distributed repeater system as claimed in claim 7, wherein the detector and microcontroller are adapted to identify a respective antenna isolation of each IAAM, based on the detected result.

9. A distributed repeater system claimed in claim 8, further comprising means for controlling a local gain of each IAAM, in response to commands generated by the microcontroller.

10. A distributed repeater system as claimed in claim 9, wherein the means for controlling a local gain of each IAAM, comprises:
- a respective IAAM microcontroller disposed in each IAAM, for receiving the commands; and
- a respective variable gain amplifier responsive to the IAAM micro controller.

11. A distributed repeater system as claimed in claim 1, wherein each IAAM comprises a respective detector and microcontroller, and the signal generator is disposed in the coverage unit.

12. A distributed repeater system as claimed in claim 11, wherein the detector and microcontroller are adapted to identify a respective local antenna isolation of the IAAM, based on the detection result.

13. A distributed repeater system as claimed in claim 12, further comprising a respective variable gain amplifier responsive to the microcontroller for controlling a local gain of the IAAM, in response to the microcontroller.

14. A distributed repeater system as claimed in claim 1, wherein each IAAM is substantially identical with the donor unit.

15. A distributed repeater system as claimed in claim 1, wherein the network of IAAMs comprises two or more IAAMs connected to the coverage unit in a chain.

16. A distributed repeater system as claimed in claim 1, wherein the network of IAAMs comprises two or more IAAMs connected to the coverage unit in a star-pattern.

17. A distributed repeater system as claimed in claim 1, wherein the network of IAAMs is coupled to an output port of the coverage unit.

18. A distributed repeater system that has:
(a) a donor unit that receives and amplifies RF signals from a fixed station of a wireless communications network;
(b) a coverage unit that is coupled to the donor unit, processes the RF signals from the fixed station, and radiates the processed RF signals into a coverage area of the repeater;
(c) a network of integrated active antenna modules (IAAMs) that are coupled to the coverage unit, each has a respective antenna integrated with active electronic components, and amplifies and radiates the RF signals into a respective portion of the coverage area of the repeater; and
(d) structure that controls stability of the distributed repeater system using:
  (i) a signal generator that generates a Coverage Area Signature (CAS) signal and inserts the CAS signal into an RF path that traverses the repeater system;
  (ii) a detector that detects signal components corresponding to the CAS signal in an input signal received by the repeater system; and
  (iii) a microcontroller that controls a gain of the repeater system based on the detected result.

19. A distributed repeater system as claimed in claim 18, comprising one signal generator and one detector coupled to an uplink path of the repeater, and a second signal generator and detector coupled to a downlink path of the repeater.

20. A distributed repeater system as claimed in claim 18, wherein the signal generator the detector, and the microcontroller are disposed in the coverage unit, and wherein the microcontroller operates to control an overall gain of the repeater system.

21. A distributed repeater system as claimed in claim 18, wherein each IAAM comprises a respective signal generator, detector, and microcontroller, and wherein the respective microcontroller of each IAAM operates to control a local gain of the IAAM.

22. A distributed repeater system as claimed in claim 21, wherein the respective CAS signal generated by the signal generator of each IAAM is unique, at least among the IAAMs forming the network.

23. A distributed repeater system as claimed in claim 18, wherein the detector and the microcontroller are disposed in the coverage unit, and each IAAM comprises a respective signal generator.

24. A distributed repeater system as claimed in claim 23, wherein the respective CAS signal generated by the signal generator of each IAAM is unique, at least among the IAAMs forming the network.

25. A distributed repeater system as claimed in claim 24, wherein the detector and microcontroller are adapted to identify a respective antenna isolation of each IAAM, based on the detection result.

26. A distributed repeater system as claimed in claim 25, further comprising means for controlling a local gain of each IAAM, in response to commands generated by the microcontroller.

27. A distributed repeater system as claimed in claim 26, wherein the means for controlling a local gain of each IAAM, comprises:
- a respective IAAM microcontroller disposed in each IAAM, for receiving the commands; and
- a respective variable gain amplifier responsive to the IAAM micro controller.

28. A distributed repeater system as claimed in claim 18, wherein each IAAM comprises a respective detector and microcontroller, and the signal generator is disposed in the coverage unit.

29. A distributed repeater system as claimed in claim 28, wherein the detector and microcontroller are adapted to identify a respective local antenna isolation of the IAAM, based on the detection result.

30. A distributed repeater system as claimed in claim 29, further comprising a respective variable gain amplifier responsive to the microcontroller for controlling a local gain of the IAAM, in response to the microcontroller.

31. A distributed repeater system that has:
(a) a donor unit that receives and amplifies RF signals from a fixed station of a wireless communications network;
(b) a coverage unit that is coupled to the donor unit and processes the RF signals from the fixed station;
(c) a network of integrated active antenna modules (IAAMs) that are coupled to the coverage unit, each IAAM including a respective antenna integrated with active electronic components, for amplifying and radiating the RF signals into a coverage area of the repeater; and
(d) a system that controls stability of the distributed repeater system using:
  (i) a signal generator that generates a Coverage Area Signature (CAS) signal and inserts the CAS signal into an RF path that traverses the repeater system;

(ii) a detector that detects signal components corresponding to the CAS signal in an input signal received by the repeater system; and (iii) a microcontroller that controls a gain of the repeater system based on the detected result.

32. A distributed repeater system as claimed in claim 31, wherein each IAAM is substantially identical with the donor unit.

33. A distributed repeater system as claimed in claim 31, wherein the network of IAAMs comprises two or more IAAMs connected to the coverage unit in a chain.

34. A distributed repeater system as claimed in claim 31, wherein the network of IAAMs comprises two or more IAAMs connected to the coverage unit in a star-pattern.

35. A distributed repeater system as claimed in claim 31, wherein the network of IAAMs is coupled to an output port of the coverage unit.

36. A distributed repeater system as claimed in claim 31, wherein the coverage unit comprises an integrated coverage antenna for radiating the RF signals into the coverage area of the repeater system.

* * * * *

UNITED STATES PATENT AND TRADEMARK OFFICE
CERTIFICATE OF CORRECTION

| | | |
|---|---|---|
| PATENT NO. | : 7,756,470 B2 | Page 1 of 1 |
| APPLICATION NO. | : 11/422108 | |
| DATED | : July 13, 2010 | |
| INVENTOR(S) | : Michael J. Roper et al. | |

It is certified that error appears in the above-identified patent and that said Letters Patent is hereby corrected as shown below:

On the Title page of the patent: Please insert;

--(73): Assignee: Spotwave Wireless Ltd., Kemptville, Ontario (CA)--

Signed and Sealed this

Twenty-third Day of November, 2010

David J. Kappos
*Director of the United States Patent and Trademark Office*